United States Patent [19]
Tillson

[11] Patent Number: 5,941,998
[45] Date of Patent: Aug. 24, 1999

[54] DISK DRIVE INCORPORATING READ-VERIFY AFTER WRITE METHOD

[75] Inventor: John Tillson, Mountain View, Calif.

[73] Assignee: Samsung Electronics Co., Ltd., Suwon-city, Rep. of Korea

[21] Appl. No.: 08/900,357

[22] Filed: Jul. 25, 1997

[51] Int. Cl.$^6$ .................................................. G06F 11/00
[52] U.S. Cl. ............................................................ 714/54
[58] Field of Search .................... 360/57, 53, 60, 360/64; 365/171, 173; 395/826, 881, 185.01, 185.07

[56] References Cited

U.S. PATENT DOCUMENTS

| | | | |
|---|---|---|---|
| 4,410,942 | 10/1983 | Milligan et al. | 395/881 |
| 4,435,762 | 3/1984 | Milligan et al. | 395/826 |
| 5,319,504 | 6/1994 | Shih | 360/53 |

*Primary Examiner*—Robert W. Beausoliel, Jr.
*Assistant Examiner*—Pierre Eddy Elisca
*Attorney, Agent, or Firm*—Jones Volentine, L.L.P.

[57] ABSTRACT

A method for verifying data written to a magnetic disk in a disk drive recording system incorporates a read-verify after write ("RVaW") procedure. For each Write command issued to the disk drive, a disk drive controller will ensure that the written data can be read back and verified successfully, before informing a host computer that the Write command is complete and the drive is ready to receive another command. If a pre-determined number of verification cycles does not result in a successful read-verify, then it is assumed that the physical location of the sector or sectors in error is permanently corrupted, and an attempt is then made to rewrite the data to spare sectors.

9 Claims, 4 Drawing Sheets

DISK DRIVE INCORPORATING READ-VERIFY AFTER WRITE METHOD

BACKGROUND OF THE INVENTION

1. Field of the Invention

The present invention generally relates to a method for ensuring data integrity in a disk drive recording system, and more particularly, to a disk drive system incorporating a read-verify after write method to ensure the accuracy of data written to a magnetic disk.

2. Description of the Related Art

Computer disk drive technology evolution has focused on improvements in "areal density", or the number of bits of information that can be stored in a given space on a magnetic disk. Over the last decade, the majority of progress has been gained through miniaturization of the recording heads and improving the magnetic efficiency of the write/read elements in the heads, and similar improvements in the magnetic and physical properties of the disks.

Disk drives contain a plurality of recording heads that "fly" over rotating disks. The magnetic recording efficiency is a function of many physical characteristics of the heads 10 and disks 20, the most significant of which is the spacing between the rotating disk 20 surface and the recording head "pole" elements 30 as shown in FIG. 1. The most straight-forward method for manufacturers to improve areal density has been to reduce the spacing between the head and disk, without sacrificing the long term reliability of the disk drive.

Across the previous disk drive industry product offerings, head-disk spacing had steadily decreased from several micro-inches to less than two micro-inches, until there came a point that further increases in areal density required the head to essentially touch the disk during flying. A new class of so-called "pseudo-contact" heads were developed in which the rear portion of the head, where the transducer poles are located, is in constant contact with the disk surface. Various design characteristics were developed to minimize friction and wear between the disk and head, and such "pseudo-contact" designs have proven to be as reliable over the long-term as the non-contact designs.

A problem arises, however, when foreign material or particles come between the head poles and the disk surface, causing a "spacing loss" that affects the magnetic recording process. The types and sources of the foreign material are numerous, including particles generated by mechanical motion of components inside the drive, from contamination introduced at the time of manufacture, to the build-up of excessive lubricant from the disk surface onto the poles of the head. The build-up of contaminants can temporarily increase the spacing between the disk and the recording head, degrading the disk drive performance. Another disadvantage is that contaminants may fall from the recording head during the stop cycles, creating enough friction between the head, the disk and the contaminants that a disk drive motor can no longer move the recording head at the commencement of the start cycle.

Great care is taken to remove sources of contamination during assembly, and in the design and fabrication of components used inside the drive to reduce potential sources of particulate generation. But no volume manufacturing operation can produce completely contamination-free products, and the migration to pseudo-contact recording has significantly increased sensitivity to contamination.

In addition, a positive air pressure with respect to the outside environment is generated inside the head disk assembly ("HDA") as a result of spinning motion of the disks. The motion of air inside the HDA allows for free movement of very small particles and contamination, and due to the large surface area of the disks can result in the material randomly landing on a disk surface. When a recording head is positioned over this area of the disk, the material can displace the head from contacting the disk for as long as it takes this area of the disk to rotate under the head. In most cases, this material remains on the disk, repeatedly displacing the head upon each disk rotation, affecting the magnetic reading or writing function. Otherwise, as a result of repeated contact with the head, the particle is moved to a different location of the disk or is removed from the disk entirely. The presence and movement of this material occurs randomly throughout the life of the disk drive product, and therefore cannot be effectively detected and screened out as part of the manufacturing process.

If this temporary "spacing loss" event occurs during a read function, there are a number of features in conventional disk drives to detect and correct read errors. Some common methods are "retries", where the read is re-attempted, and "ECC Correction", where correction codes appended to the end of the data block are used to determine what the data should have been and then making the correction before transfer to the host computer. Thus although these events are relatively rare, when they occur they often are not detected during read operations.

On the other hand, the writing functions of disk drives do not allow for a methodology of validating that data was written correctly. It is assumed that if a write function is completed successfully, then the write process reliably wrote the magnetic patterns on the disk. However if a temporary spacing loss occurs during a write, it is usually not detected until long after the data was written, at a later time when attempting to read the data. The result is non-recoverable read errors that are reported to the user as lost data. This problem is most commonly known as "High Fly Write", which describes the vertical position of the recording head temporarily being too high during the write process.

In light of the foregoing, there exists a need for a system and method for eliminating or reducing the "High Fly Write" problem, without materially degrading the performance of the disk drive.

SUMMARY OF THE INVENTION

The present invention is directed to a read-verify after write procedure incorporated in a disk drive which substantially overcomes one or more of the problems due to the limitations and disadvantages of the related art.

In general, the present invention overcomes the High Fly Write problem by incorporating an automatic verification of the written data before completing the write command. The automatic verification feature is not controllable by the host computer system, nor is the computer user aware that the feature is invoked. The result is improved disk drive product reliability as realized through increased data integrity.

The automatic verification feature comprises a read-verify after write ("RVaW") procedure that is incorporated into the disk controller firmware, or microcode. For each Write command issued to the drive, the disk controller will verify that the written data can be read back and verified successfully, before informing the host computer that the Write command is complete and the drive is ready to receive another command.

To achieve these and other advantages and in accordance with the purpose of the invention, as embodied and broadly described, the invention provides for a method for verifying data written to a magnetic disk in a disk drive recording system connected to a host computer, the method comprising the steps of: (a) receiving a write command from the host computer; (b) issuing a block write command to a disk controller; (c) writing data to designated sectors of the magnetic disk; (d) issuing a read-verify command of the data written to the designated sectors; and (e) determining whether errors are present in the read-verified data.

In another aspect, after the determining step (e), and when errors are present, the present inventive method additionally provides a step of verifying whether a designated number of read-verify commands have been attempted. If the designated number of read-verify commands have been attempted and errors are still present, an attempt is made to write the data to alternate sectors. If less than the designated number of read-verify commands have been attempted, the block write command is re-issued only for those blocks in error; and the issuing step (d) and the determining step (e) above are again performed in sequence.

It is to be understood that both the foregoing general description and the following detailed description are exemplary and explanatory and are intended to provide further explanation of the invention as claimed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention is directed a disk drive system having increased data integrity by incorporating an automatic verification of the written data before completing the write command. The automatic verification feature is not controllable by the host computer system, nor is the computer user aware that the feature is invoked. The automatic verification feature comprises a read-verify after write ("RVaW") process that is incorporated into the disk controller firmware, or microcode. For each Write command issued to the drive, the disk controller will verify that the written data can be mad back and verified successfully before informing the host computer that the Write command is complete and the drive is ready to receive another command.

Generally, to verify the written data, the disk controller microcode invokes a Read-Verify command of the same data sectors immediately following the write function, while retaining the just-written data in a write cache buffer. The Read-Verify command reads back the data and checks for errors without overwriting the just-written data with the next block of to-be-written data in the write cache buffer. Should the Read-Verify of the written data result in an error, then this RVaW feature will re-write the still write cache buffer stored data to the original sectors. The disk controller will then again invoke another Read-Verify of the written data.

If a pre-determined number of verification cycles does not result in a successful Read-Verify, then it is assumed that the physical location of the sector or sectors in error is permanently affected by High Fly Write conditions, or has in some other way become corrupted, and those sectors are relocated to spare sectors at the end of each data zone. If the write function to spare sectors still does not result in a successful Read-Verify, then an error is reported back to the host.

Figure 1:
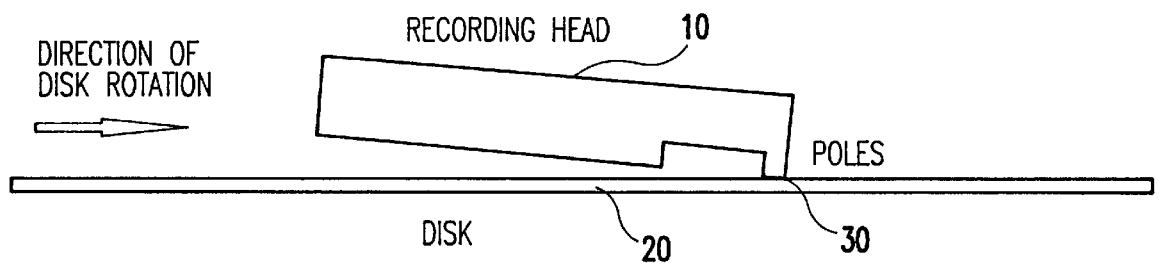
FIG. 1 is a side view of a recording head "flying" over a disk.
Figure 2:
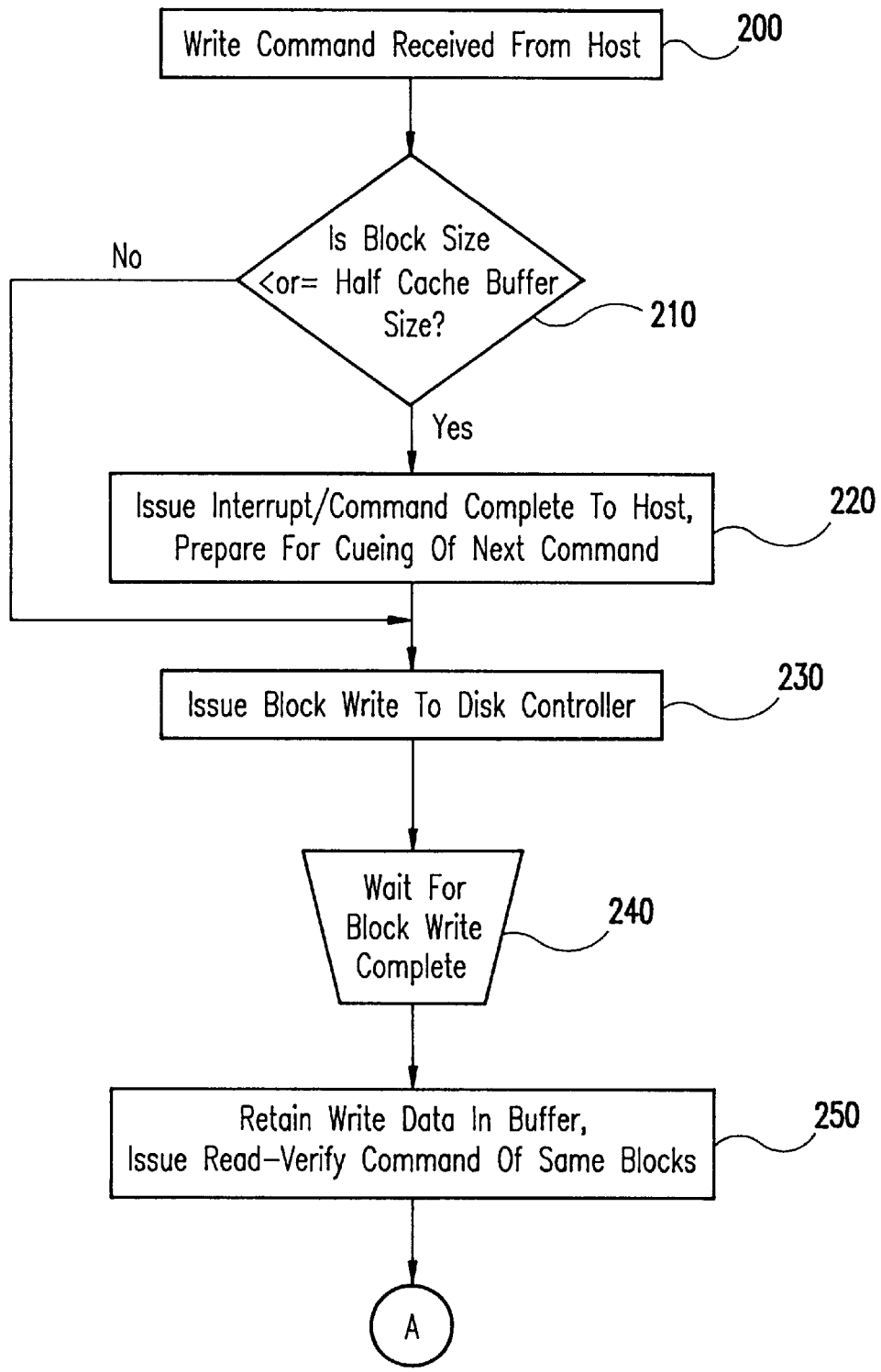
FIG. 2 is a flowchart depicting the initial block writing portion of the read-verify after write (RVaW) method of the present invention.

The method of the present invention will now be more specifically described with reference to FIGS. 2–4. FIG. 2 sets forth a flowchart of the initial block writing portion of the read-verify after write (RVaW) method of the present invention.

First, the Write command is received from the host computer (step 200). If the block size to be written is less than or equal to one-half of the size of a write cache buffer in the disk controller (step 210), an interrupt/command complete message is issued to the host computer so the host computer can prepare for the next command (step 220). A Block Write command is then issued to the disk controller (step 230).

Note that if the block size to be written is greater than one-half of the size of the write cache buffer in the disk controller (step 210), a Block Write command is still issued to the disk controller (step 230), but, no interrupt/command complete message is issued to the host computer so the host computer cannot prepare for the next command. This determination step 210 thus ensures that the write cache buffer does not fill up as a result of a continuous stream of Write commands from the host computer.

Immediately following the write function (step 240), the disk controller microcode invokes a Read-Verify command of the same data sectors to verify the written data, while retaining the write data in its write cache buffer (step 250).

There is a performance cost associated with this RVaW feature, since every Write command from the host to the disk drive requires a minimum of one disk rotation to complete the Write command, followed by another disk rotation to conduct the Read-Verify. Essentially, every Write command requires an additional disk rotation as compared to a Write command without RVaW. This could theoretically result in a doubling of write command execution time. However, the write cache feature of the disk controller minimizes this performance penalty by informing the host computer that the Write command is complete before the actual writing of data, causing much of the mechanical latencies associated with moving the head over the correct physical location on the disk to appear to be shorter than the actual time. Then the physical writing of data occurs while the host is preparing its next command or is sending the next command to the drive.

Figure 3:
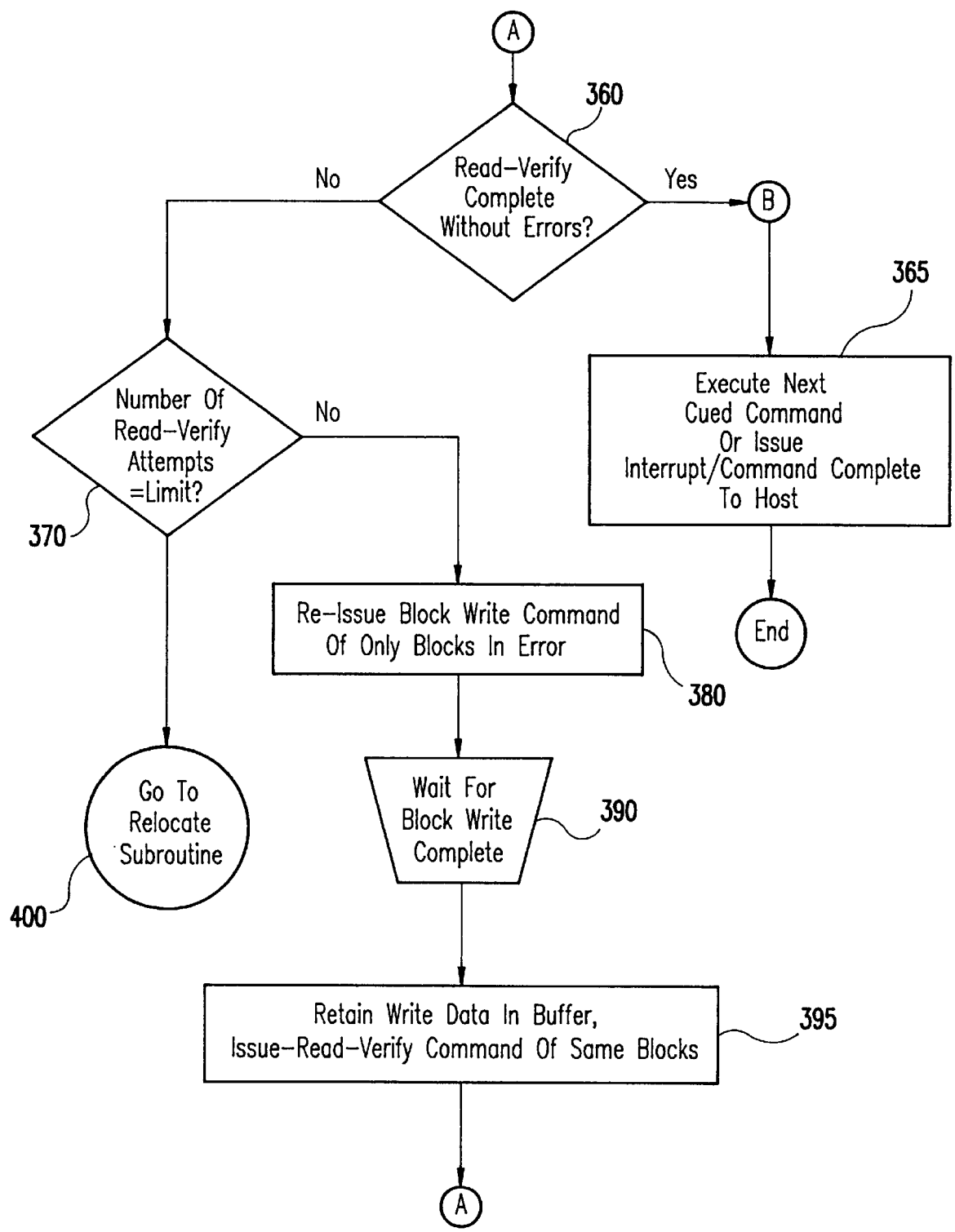
FIG. 3 is a flowchart depicting the read-verify portion of the method of the present invention.

Referring now to FIG. 3, the RVaW procedure continues with the Read-Verify command reading back the data and checking for errors without overwriting the just-written data with the next block of to-be-written data (step 360). If the Read-Verify is complete without errors, the next cued command would normally be executed (step 365). However, if the interrupt/command complete message in step 220 of FIG. 2 was bypassed, the interrupt/command complete message would now be issued to the host computer (step 365).

Should the Read-Verify of the written data result in an error, then this RVaW feature will re-write the data to the original sectors (step 380), by re-issuing a Block Write command of only the blocks in error. As described previously with regard to steps 240 and 250, the disk controller will then invoke another Read-Verify command (step 395) after the data is written (step 390).

When the Read-Verify of the written data results in an error being identified, a verification step 370 is carried out prior to re-issuing the Block Write command in step 380. Specifically, if a pre-determined discretionary number of verification cycles does not result in a successful Read-Verify, then it is assumed that the physical location of the sector or sectors in error is permanently affected by High Fly Write conditions, or has in some other way become corrupted, and those sectors are relocated to spare sectors at the end of each data zone as set forth in the relocate subroutine of step 400 as described below. The discretionary number of verification cycles involves a trade-off of performance versus accuracy, and is thus dependent on the particular disk drive manufacturer.

Figure 4:
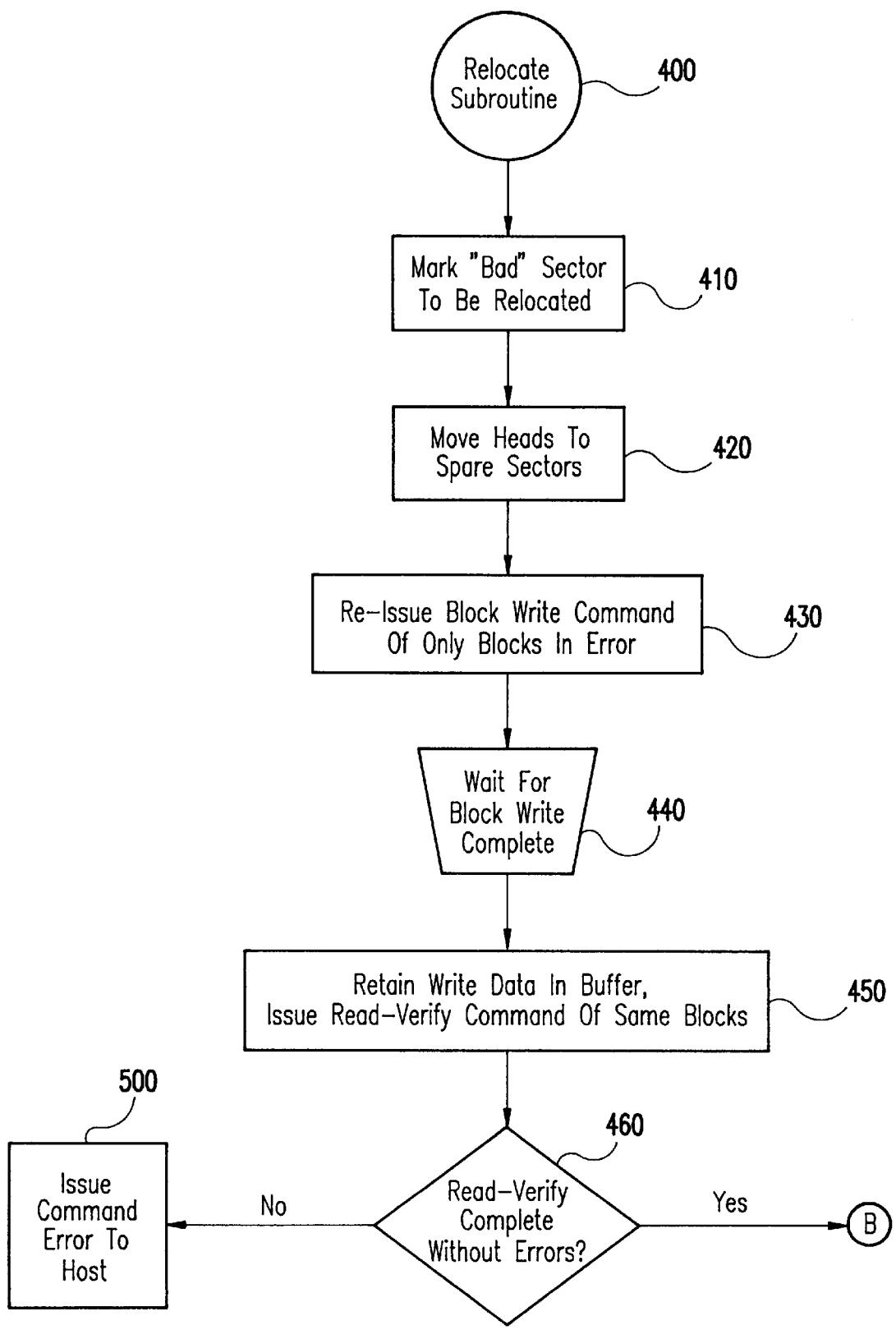
FIG. 4 is a flowchart depicting the subsequent writing portion of the read-verify method of the present invention, after the number of read-verify attempts meets a designated limit.

FIG. 4 sets forth the steps of the relocate subroutine. First, the "bad" sectors to be relocated are marked (step 410) while the heads are moved to the spare sectors (step 420). Thereafter, the RVaW feature will re-write the data to these spare sectors by re-issuing a Block Write command of only the blocks in error (step 430). Again, the disk controller will invoke another Read-Verify command (step 450) after the data is written (step 440). If the write function to the spare sectors still does not result in a successful Read-Verify (step 460), then an error is reported back to the host (step 500). If the Read-Verify is complete without errors, the next cued command is executed, or an interrupt/command complete message is issued to the host computer as in step 365.

In accordance with the present invention, the automatic read-verify after write RVaW procedure will verify that the written data can be read back and verified successfully, before informing the host computer that the Write command is complete and the drive is ready to receive another command.

While the invention has been described in terms of the embodiments described above, those skilled in the art will recognize that the invention can be practiced with modification within the spirit and scope of the appended claims and their equivalents.

Having thus described my invention, what I claim as new and desire to secure by Letters Patent is as follows:

1. A method of verifying data written to a magnetic disk in a disk drive recording system connected to a host computer, the method comprising the steps of:

(a) receiving a write command from the host computer;

(b) issuing a block write command to a disk controller;

(c) writing data to designated sectors of the magnetic disk;

(d) issuing a read-verify command of said data written to said designated sectors; and (e) determining whether errors are present in said read-verify data;

(f) determining whether a block size of said write command is less than or equal to one-half a write cache buffer size;

(g) proceeding with issuing step (b) if the block size of said write command is greater than one-half the write cache buffer size; and (h) issuing an interrupt/command complete message to the host computer for preparing said host computer for a cueing of a next write command if the block size of said write command is less than or equal to one-half the write cache buffer size.

2. The method of verifying data as in claim 1, wherein said issuing step (d) comprises a sub-step of retaining said data written in the write cache buffer while said read-verify command is being carried out.

3. The method of verifying data as in claim 2, wherein after said determining step (e), and when no errors are present, the method further comprising the steps of:

(i) executing the next cued write command if the block size of said write command of step ( )was less than or equal to one-half the write cache buffer size; and (j) issuing an interrupt/command complete message to the host computer for preparing said host computer for a cueing of a next write command if the block size of said write command of step (f) was greater than one-half the write cache buffer size.

4. The method of verifying data as in claim 2, wherein after said determining step (e), and when errors are present, the method further comprising the step of:

(k) verifying whether a designated number of read-verify commands have been attempted.

5. The method of verifying data as in claim 4, wherein after said verifying step (k), the method further comprising the steps of:

(l) writing said data to alternate sectors if the designated number of read-verify commands have been attempted.

6. The method of verifying data as in claim 5, wherein said writing step (l) comprises the sub-steps of:

(o) marking sectors to be relocated to alternate sectors;

(p) moving disk drive heads to the alternate sectors;

(q) re-issuing said block write command only for those blocks in error; and (r) performing said issuing step (d) and said determining step (e) again in sequence.

7. The method of verifying data as in claim 6, wherein after said performing step (r), and when no errors are present, the method further comprising the step of:

(s) performing said executing step (i) and said issuing step (j).

8. The method of verifying data as in claim 4, wherein after said verifying step (k), and if less than the designated number of read-verify commands have been attempted, the method further comprising the steps of:

(m) re-issuing said block write command only for those blocks in error; and (n) performing said issuing step (d) and said determining step (e) again in sequence.

9. The method of verifying data as in claim 6, wherein after said performing step (r), and when errors are present, the method further comprising the step of:

(t) is suing an error message to the host computer .

* * * * *